Sept. 27, 1960 B. K. NELSON 2,954,524

PHASE COMPARATOR SYSTEM

Filed Jan. 2, 1959 2 Sheets-Sheet 1

BRUCE K. NELSON
*INVENTOR.*

BY Alden D Redfield
Abraham Ogman
ATTORNEYS

Sept. 27, 1960 B. K. NELSON 2,954,524

PHASE COMPARATOR SYSTEM

Filed Jan. 2, 1959 2 Sheets-Sheet 2

BRUCE K. NELSON
*INVENTOR.*

BY Alden D Redfield
Abraham Ogman
ATTORNEYS 2,954,524
Patented Sept. 27, 1960

2,954,524

PHASE COMPARATOR SYSTEM

Bruce K. Nelson, Concord, Mass., assignor to Avco Manufacturing Corporation, Cincinnati, Ohio, a corporation of Delaware Filed Jan. 2, 1959, Ser. No. 784,509

7 Claims. (Cl. 324—88)

Figure 1:
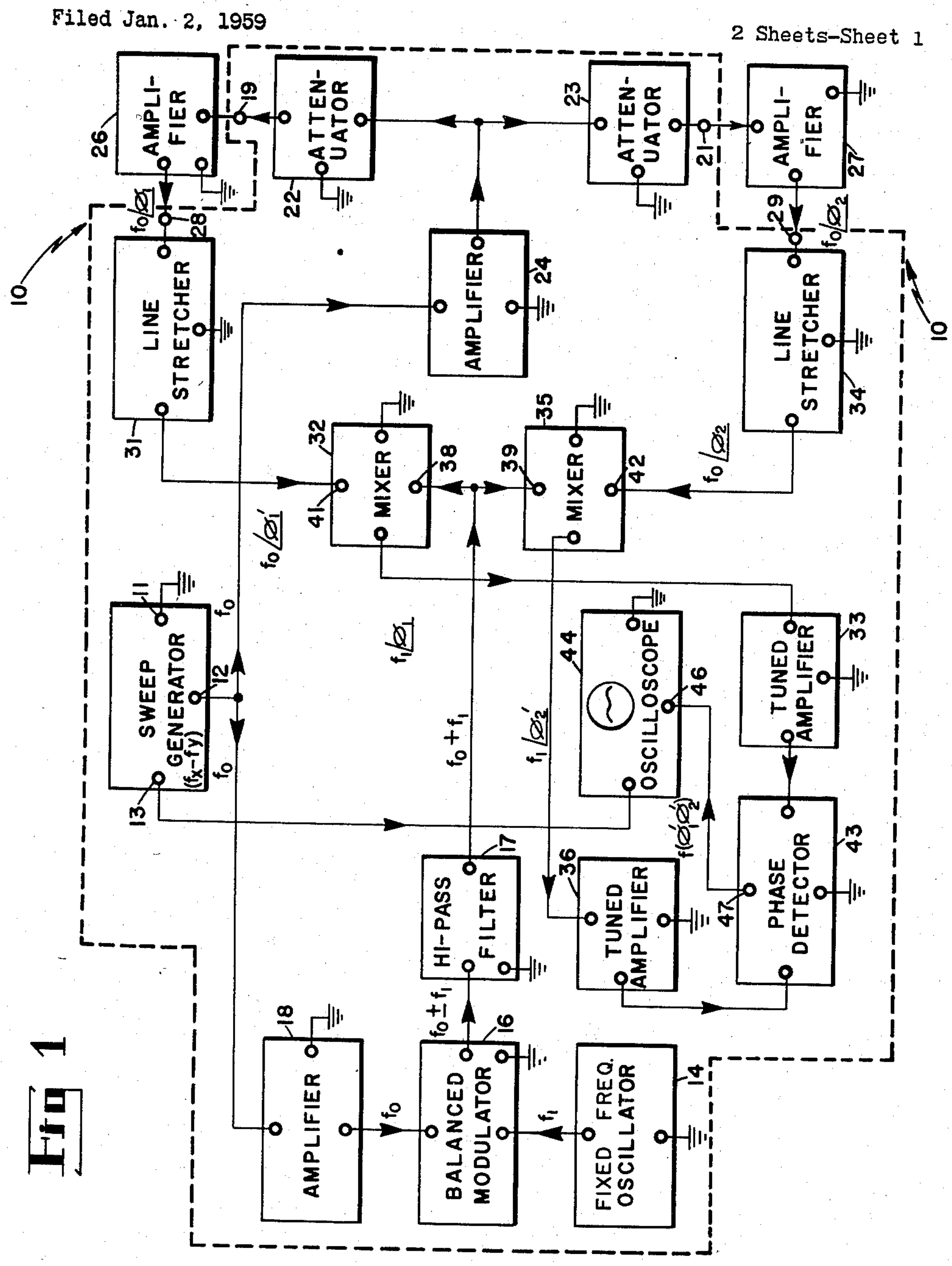

This invention relates to a phase comparator system and, in particular, to an electronic phase comparator system which utilizes heterodyne mixing techniques for comparing the phase transfer characteristics of high frequency devices.

It is often necessary to determine how two seemingly similar devices affect the phase of a signal passing through them, or to adjust the phase characteristic of one device to correspond to that of another. At low frequencies, in the order of 50 megacycles for example, the comparison is made by applying output signals from the devices to a phase detector and utilizing the output from the phase detector as an indication of the difference in the phase of the translated signals. However, at frequencies above 50 megacycles a problem arises by virtue of the fact that phase detectors cannot easily be made to operate accurately at such high frequencies; this difficulty is further increased when it is desirable to make a phase transfer comparison over a relatively wide band of frequencies.

Accordingly, it is an object of the invention to provide an electronic phase comparator system which avoids one or more of the limitations and disadvantages of prior comparator systems.

It is another object of the invention to provide an electronic phase comparator system which:

(1) Utilizes heterodyne mixing techniques for converting a high frequency signal to a lower measurable signal without affecting the phase characteristic of the high frequency signal.

(2) Makes use of a single signal supply source for providing an input signal to the devices to be compared and for developing a heterodyne signal.

(3) Is capable of comparing the phase between two signals over a higher and wider range of frequencies than is possible using known phase comparator systems.

(4) Performs a quantitative measurement between the phase transfer functions of two devices.

In accordance with the invention, the electronic phase comparator system comprises a first signal supply means for providing a first signal, whose frequency may be varied, and a second signal supply means for providing a second signal of fixed frequency. The comparator system also includes means, comprising a modulator, for generating a third signal whose frequency is equal to the sum of the frequencies of the fixed and variable signals. Terminal means are provided for coupling test signals, whose phases are to be compared, to the phase comparator system. The electronic phase comparator also includes signal generating means which are responsive to the third sum signal and the test signals for generating comparison signals, each comparison signal having a phase which is a function of the phase of the test signal from which it is derived. Finally, the electronic phase comparator includes a phase detector for comparing the comparison signals for generating an output signal whose magnitude and polarity is representative of the difference in phase between the comparison signals.

Figure 2:
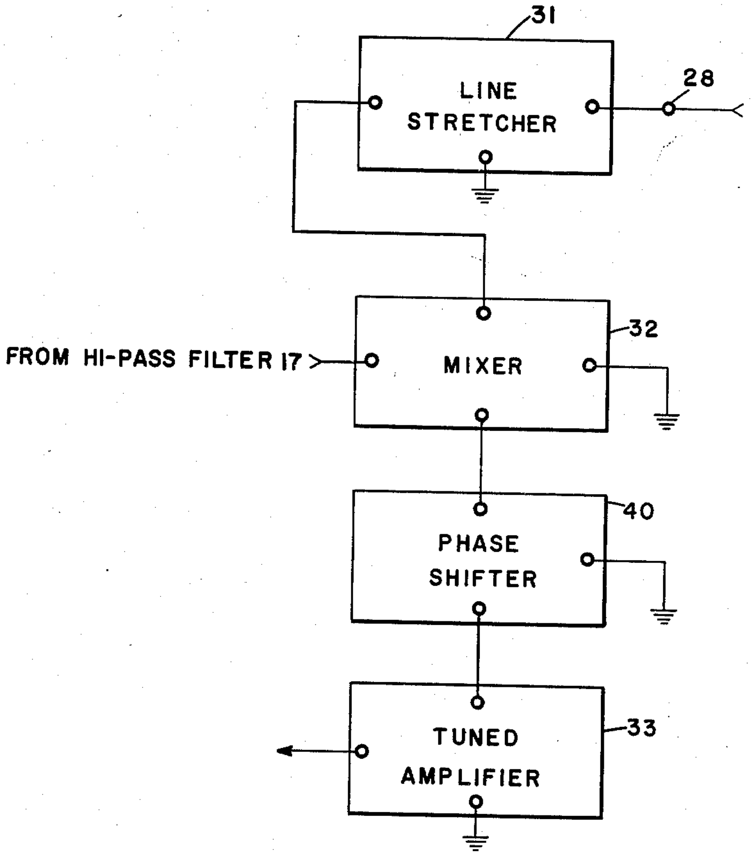

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Fig. 1 is a block diagram representing an electronic phase comparator system embodying the principles of the present invention; and Fig. 2 is a block representation of a signal generating means of the Fig. 1 comparator showing a calibrated phase shifter therein.

DESCRIPTION OF THE ELECTRONIC PHASE COMPARATOR SYSTEM

Referring to Fig. 1 there is represented therein a block diagram of an electronic phase comparator system 10 embodying the principles of the present invention. The phase comparator 10 comprises a combination of conventional, commercially available circuit elements coupled together to provide a new and novel system for comparing the phase of two high frequency signals. In this connection, it is not necessary to describe in detail the construction of the block elements. The design of these circuits will be obvious to a person skilled in the art with knowledge of their function and operation as will be described hereinafter.

The electronic phase comparator system 10 comprises a first signal supply means for providing a sinusoidal signal whose frequency may be varied. The first signal supply means comprises a sweep generator 11 which generates a sinusoidal first signal whose frequency, designated $f_0$, is varied between an upper and a lower limit of a frequency band at a periodic rate. The sweep generator 11 includes a terminal 12 from which the sinusoidal first signal is coupled to other circuit elements of the system, and a synchronizing terminal 13 which furnishes a synchronizing signal utilized elsewhere in the system, as will be described hereinafter.

A second supply means for providing a second signal, designated $f_1$, is also included in the phase comparator 10. The second signal supply means comprises a fixed frequency oscillator 14 which may, for example take the form of any of the well known crystal controlled oscillators.

The phase comparator system 10 also includes means for generating a signal when frequency is equal to the sum of the fixed frequencies of the fixed frequency signal and variable frequency sinusoidal signal and comprises a balanced modulator 16 and a high pass filter 17. One input signal to the balanced modulator comprises a portion of the first signal from the sweep generator 11 which is coupled to an amplifier 18 and amplified before it is applied to the balanced modulator 16. The second input signal to the balanced modulator 16 comprises the fixed frequency second signal from the fixed frequency oscillator 14. There is produced in the balanced modulator a signal, designated $f_0 \pm f_1$, which is equal to the sum and the difference of the frequencies of the first and second signals, the sweep generator signal being suppressed by the balanced nature of the circuit. The aforementioned sum and difference signal is applied to the high pass filter 17 which is designed to pass the sum signal while blocking the passage of the difference signal. The decision to pass the sum signal is largely arbitrary, since the phase comparator system 10 can be made to operate on the difference signal. However, as a practical matter, it was found that by using the sum signal the number and magnitude of the spurious signals inherent to heterodyne systems were materially reduced. The sum signal comprises a third signal which is a function of the frequencies of the first and second signals.

For illustrative purposes the devices whose phase characteristics are to be examined will be assumed to be amplifiers, although the phase comparator system will operate as well for other devices, such as delay lines. Referring to Fig. 1 it is seen that a pair of amplifiers 26 and 27 are shown coupled to the phase comparator system 10.

Under normal conditions the sweep generator 11 is used as a signal source for developing the test signals to assure synchronism of the test signals to the first signal. In this connection, output terminal 12 is coupled to an amplifier 24 where it is amplified and translated to a pair of attenuators 22 and 23. The attenuators 22 and 23 are coupled to output terminals 19 and 21 respectively. These terminals are adapted to provide input signals to the equipment being tested, in this case amplifiers 26 and 27 respectively. Attenuators 22 and 23 are provided for adjusting the amplitudes of the test signals derived from amplifiers 26 and 27 to a desired value. The test signals developed in the amplifiers 26 and 27 are coupled to a pair of input terminals 28 and 29 respectively.

The phase comparator 10 also includes a signal generating means responsive to the third signal and one test signal for generating a comparison signal whose phase is representative of the phase of the test signal. The signal generating means includes a line stretcher 31 coupled to a mixer 32. The line strecher provides means for modifying the phase of a signal applied thereto by a fixed amount, the magnitude of which can be accurately determined. The output circuit of the high pass filter 17 is coupled to a second input terminal 38 of the mixer 32.

The signal generating means also includes a tuned amplifier 33 coupled between the output of the mixer 32 and a phase detector 43.

A second signal generating means having components, of an identical nature as in the signal generating means just described, i.e. a line stretcher 34, mixer 35 and tuned amplifier 36, is coupled between terminal 29 and the phase detector 43. The phase detector 43 acts in a conventional manner to compare the signals applied thereto and to develop an output signal which is representative of the difference in phase between the test signals applied thereto from the signal generating means. The phase detector 43 is coupled to an oscillosocpe 44 for visually displaying the output signal generated in the phase detector 43. Oscilloscope 44 is conventional in construction and design and operates in synchronism with the sweep frequency of the sweep generator 11. The synchronism is accomplished by coupling the oscilloscope to terminal 13 of the sweep generator 11.

*Operation of the electronic phase comparator system 10*

An important application of the phase comparator system 10 is the measurement of the difference in phase between two signals derived from two amplifiers, as the signal input to the amplifiers is varied through a band of frequencies. For example, it may be desired to determine the phase difference in a frequency band of 480 to 520 megacycles. From a practical standpoint the well known approach of applying the signals whose phase is to be compared to a phase detector cannot be used at these frequencies. Accordingly, the phase comparator system 10 provides means for converting the high frequency signals from the amplifiers to a lower frequency signal which can be phase compared without disturbing the phase characteristic of the respective signals as they are determined by the amplifiers being tested.

Since it is proposed to use a heterodyne technique for reducing the test signals to a workable frequency, and since the test will be conducted over a broad band of frequencies, and furthermore, since inherent in any heterodyne technique is the danger of creating spurious signals, the phase comparator system converts the test signals to fixed frequency comparison signals to avoid the limitations just discussed. In converting to a fixed lower frequency signal simply constructed, tuned circuits, which automatically reject spurious signals, may be used.

For purposes of illustration, it will be assumed that the relative phase differences of amplifiers 26 and 27 are to be compared. Normally, it is necessary to calibrate the system before taking a measurement; however, an outline of the calibration technique will be greatly simplified if it is delayed until the operation of the system is described. Accordingly, a discussion of the calibration will be presented hereinafter.

Briefly, the operation of the phase comparator system 10 is as follows. The signal generated by sweep generator 11 comprises a sinusoidal first signal whose frequency is varied through a band of frequencies at a periodic rate. In other words, the frequency of the signal derived from the sweep generator 11 may be made to vary from a frequency of $f_x$ to $f_y$ linearly and at a 60 cycle rate, for example. At any instant in time, however, the frequency of the signal derived from the sweep generator 11 can be assumed to have a fixed frequency, $f_0$, for example, where $f_0$ lies within the band of frequencies between $f_x$ and $f_y$. For this discussion the phase of the first signal will be used as a reference and assumed to be zero.

A portion of the sweep generator signal, at a frequency $f_0$ is coupled through amplifier 24 where it is amplified and applied to attenuators 22 and 23. From the attenuators the signal is coupled through output terminals 19 and 21 respectively to the input circuit means of amplifiers 26 and 27 respectively. At this time, the attenuators 22 and 23 are adjusted until the output signal from the amplifiers comprising the test signals are equal in amplitude. This may be simply done by attaching a peak detector to the output of the amplifiers 26 and 27 and noting the magnitude of the detected signal while adjusting the attenuators 22 and 23. From the amplifiers 26 and 27 the test signals, are coupled through input terminals 28 and 29 to line stretchers 31 and 34 respectively. The test signals from amplifiers 26 and 27 are designated $f_0 L\phi_1$ and $f_0 L\phi_2$, respectively, where $\phi_1$ and $\phi_2$ reflect the phase of the test signals The line stretchers 31 and 34 have many uses in the operation of the phase comparator system 10. They are used to calibrate the system as will be explained hereinafter. At this time, however, their performance will be described with regards to measuring the phase difference between the test signals obtained from the amplifiers 26 and 27. If the amplifiers 26 and 27 are substantially identical in construction, it is reasonable to expect that the phase difference between the output signals will be small and easily detectable on the phase detector 43. However, if one amplifier, amplifier 26 for example, contains an additional stage of gain over amplifier 27, the phase of the test signal obtained from amplifier 26 will be nearly 180° out of phase from the signal obtained from the amplifier 27. For convenience of measurement, it is desirable to bring the signals more nearly in phase. Accordingly, line stretcher 31 may be varied in a conventional manner to impart a fixed phase shift to the test signal from amplifier 26 so that the signal output from the line stretcher 31 is substantially in phase with the signal output from amplifier 27. The amount of phase shift added by the line stretcher 31, is noted and constitutes a constant which must be added to the phase difference subsequently determined. In a similar manner, the line stretcher 34 may have been varied in order to bring the phase of the signal at its output into line with the signal from the amplifier 26. In view of the foregoing, the signals applied to mixers 32 and 35 are varying at a frequency $f_0$ and have substantially identical phase characteristics. These signals are designed $f_0 L\phi_1'$, and $f_0 L\phi_2'$, where the prime (′) reflects the fixed phase shifts which may have been added to the test signals.

Simultaneously with the application of the signals to the amplifiers 26 and 27 a second signal from sweep generator 11, also at the frequency $f_0$ is applied through the amplifier 18 to the balanced modulator 16. In the balanced modulator 16, the $f_0$ signal is modulated by $f_1$ signal from the fixed frequency oscillator 14 which is applied to the second input of the balanced modulator 16. As is well known, the output signal from the balanced modulator 16 comprises the sum and difference signals, in this case $f_0 \pm f_1$. The sum and difference signals are applied to the high pass filter 17 which passes the sum signal and blocks the passage of the difference signal. It will be noted that the sum and difference signals carry the same phase as the $f_0$ signal derived from the sweep generator 11. The sum signal $f_0+f_1$ is divided into two parts and coupled to mixers 32 and 35 in which they are mixed with the output signals from line stretchers 31 and 34. The mixers 32 and 35 mix their respective input signals and generate comparison signals whose frequencies are $f_1$ but whose phase is determined by the test signals derived from the amplifiers 26 and 27. By referring to Fig. 1 it will be noted that the comparison signals from the mixers 32 and 35 are coupled to tuned amplifiers 33 and 36, respectively, whose function is to amplify these signals and to reject spurious signals generated during the modulating and mixing functions which comprise the heterodyne operation. The tuned amplifiers 33 and 36 are, therefore, narrow band devices and pass only $f_1$ frequency signals. As has been previously mentioned these fixed $f_1$ frequency comparison signals contain the phase information derived from the amplifiers 26 and 27. Accordingly, after being amplified in the narrow band amplifiers 33 and 36 they are applied to the phase detector 43. The phase detector 43 acts in a conventional manner to produce a D.C. signal whose polarity and magnitude is generally a function of $\phi_1'$ and $\phi_2'$ but in particular is representative of the difference in phase between signals applied to its two inputs. This D.C. voltage is coupled from the phase detector 43 to the oscilloscope 46 where it is displayed as a vertical deflection.

The previous discussion describing the passage and nature of the signals in the several channels comprising the phase comparator system dealt with a single fixed frequency $f_0$ obtained from the sweep generator 11. Normally, however, the sweep generator is producing signals whose frequencies are varied periodically through a band of frequencies designated $f_x$—$f_y$. It will be noted, however, regardless of the frequency obtained from the sweep generator 11 the frequency of the signals generated in the mixers 32 and 35 are constant at $f_1$. This state of affairs is brought about by virtue of the fact that an output signal from the sweep generator 11 is used to provide the input signal to the amplifiers 26 and 27 and also to generate the sum signal $f_0+f_1$. Accordingly, the difference in the frequencies of these signals is at all times $f_1$. This concept of using a single fixed frequency signal to carry the phase information to the phase detector reduces materially the disrupting effects of spurious signals, and greatly reduces the complexity of the amplifiers 33 and 36, and of the phase comparator.

It is acknowledged that the several components, for example, amplifiers 18 and 24 and tuned amplifiers 33 and 36, that are combined to form the phase comparator system 10 may have slight differences in their phase transfer characteristics brought about by differences in construction or variations caused by operating over an extended length of time. Accordingly, it is necessary to calibrate the phase comparator system 10 prior to making a comparison of the phase between the amplifiers 26 and 27. To calibrate the phase comparator system 10 output terminal 19 is tied to input terminal 28 and output terminal 21 to input terminal 29. In this way the respective signal channels receive input test signals whose phase characteristics are identical to the signals being applied to the balanced modulator and high pass filter. There are no external circuits causing a phase shift to occur, and any noticeable phase shift is a result of the internal component elements of the phase comparator system 10. Any differences that are observed, however, can be cancelled out by adjusting either of the line stretchers 31 and 34 until the display on the oscilloscope indicates that a complete balance has been obtained.

While the foregoing discussion is directed towards measuring a relative phase difference between two amplifiers, it is clear that if one amplifier, 27 for example, represents a reference amplifier the phase comparator system 10 may be used to determine the amount of phase shift correction that is required to make the amplifier 26 correspond to the amplifier 27. On the other hand, delay lines may be substituted for amplifiers 26 and 27 and their phase characteristics compared. Furthermore, the phase transfer characteristic of an amplifier may be compared with a delay line. In other words, the phase comparator system 10 is a versatile tool which accurately determines relative phases between two devices or is adapted to provide an absolute phase reading for a single device.

For most needs a quantitative measurement of the phase difference may be obtained by first calibrating the oscilloscope and noting the magnitude of the vertical deflection displayed thereon. The phase difference may also be determined by adjusting a line stretcher until a null is observed on the oscilloscope, at which time the adjustment is recorded. This latter method is not satisfactory for several reasons. In the first place, the line stretcher is used to calibrate the system and if it is varied to read phase shift, the system must be subsequently recalibrated. Furthermore, since a line stretcher is simply a transmission line having an adjustable physical length, it represents an ambiguous phase measurement device. The amount of phase shift provided by a fixed physical length is a function of frequency. Therefore, to determine the phase shift added to a signal by a line stretcher, its length must first be accurately determined and this length must then be converted to a phase shift at a specific frequency.

To facilitate the process of obtaining accurate quantitative information on the phase difference, without affecting the calibration of the system, this invention comprehends the use of the fixed frequency signal generated in the mixer found in the signal generating means. Referring to Fig. 2 of the drawings there is shown one of the signal generating means comprising the line stretcher 31, the mixer 32, the tuned amplifier 33. Also shown in Fig. 2, inserted between the mixer 32 and the tuned amplifier 33 is a phase shifter 40. The phase shifter 40 may take any suitable form well known in the art. Because the signals applied thereto are at a fixed frequency, the phase shifter 40 may be calibrated directly in phase with a high degree of accuracy, thus facilitating the determination of the phase difference. One simple means for determining the phase difference, is to adjust the phase shifter 40 until a null is noted on the oscilloscope 44.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A phase comparator system comprising: a sweep generator means for providing a first signal whose frequency may be periodically varied through a band of frequencies; a second signal supply means for providing a second signal whose frequency is fixed; modulation means for generating a signal having components whose frequencies are equal to the sum and difference frequencies of the first and second signal; filter means for translating the sum signal; means for deriving test signals, whose phases are to be compared, from said sweep generator; signal generating means including mixing circuits responsive to the third signal and one test signal for generating a comparison signal whose phase is representative of the phase of the test signal; second signal generating means including mixing circuits responsive to the third signal and a second test signal for generating another comparison signal whose phase is representative of the phase of the second test signal; a line stretcher coupled to signal generating means for adjusting the phase of the signals therein; comparison means for comparing the comparison signals for generating an output signal which is a function of the difference in phase between the comparison signals; and display means for visually displaying the output signal, said display means being synchronized to said sweep generator.

2. A phase comparator system for determining the phase difference between test signals comprising: a first signal supply means for providing a first signal whose frequency may be varied in synchronism with the test signals; a second signal supply means for providing a second signal whose frequency is fixed; means for generating a third signal whose frequency is a function of the frequencies of the first and second signal; signal generating means responsive to the third signal and one test signal for generating a comparison signal whose phase is representative of the phase of the test signal; second signal generating means responsive to the third signal and a second test signal for generating another comparison signal whose phase is representative of the phase of the second test signal; comparison means for comparing the comparison signals for generating an output signal which is a function of the difference in phase between the comparison signals; and means in one of the signal generating means for modifying the phase of a comparison signal.

3. A phase comparator system comprising: a sweep generator for providing a first signal whose frequency is periodically swept through a band of frequencies; a signal supply means for providing a fixed frequency signal; modulating means for providing a third signal whose frequency is a function of the variable frequency signal and the fixed frequency signal; means for deriving test signals whose phases are to be compared from said sweep generator; signal generating means, including mixers which are responsive to the third signal and the test signals for generating comparison signals both of whose frequencies are equal to the fixed frequency and each comparison signal having a phase which is representative of the phase of the test signal from which it is derived; and comparison means for comparing the phases of the comparison signals and generating an output signal whose magnitude and polarity is representative of the difference in phase between the comparison signals; and a visual display device comprising an oscilloscope which is in synchronism with the sweep generator for displaying the output signal.

4. A phase comparator system as described in claim 3 which includes phase shift means for modifying the phase for at least one of the comparison signals for measuring the phase difference.

5. A phase comparator system comprising: a sweep generator for providing a first signal whose frequency is periodically swept through a band of frequencies; a signal supply means for providing a fixed frequency signal; modulating means for providing a third signal whose frequency is a function of the variable frequency signal and the fixed frequency signal; means for deriving test signals whose phases are to be compared from said sweep generator; signal generating means, including mixers which are responsive to the third signal and the test signals for generating comparison signals both of whose frequencies are equal to the fixed frequency and each comparison signal having a phase which is representative of the phase of the test signal from which it is derived; and comparison means for comparing the phases of the comparison signals and generating an output signal whose magnitude and polarity is representative of the difference in phase between the comparison signals; means, in at least one of said signal generating means, for calibrating the phase comparator system.

6. A phase comparator system as described in claim 5 in which said calibrating means comprises a line stretcher for adjusting the phase of a signal coupled thereto.

7. A phase comparator system for determining the phase difference between test signals comprising a first signal supply means for providing a first signal whose frequency is equal to that of the test signals; a second signal supply means for providing a second signal; means for generating a third signal whose frequency is a function of the frequencies of the first and second signals; means coupled to and responsive to the third signal and the test signals for generating comparison signals, each comparison signal's phase being a function of the phase of the test signal from which the comparison signal is derived; and comparison means for comparing the comparison signals for generating an output signal which is a function of the difference in phase between the comparison signals; and phase shift means for modifying the phase of at least one of the comparison signals.

References Cited in the file of this patent

UNITED STATES PATENTS

| | | |
|---|---|---|
| 2,416,310 | Hansen | Feb. 25, 1947 |
| 2,498,242 | Boykin | Feb. 21, 1950 |
| 2,534,957 | Delvaux | Dec. 19, 1950 |
| 2,618,686 | DeLange | Nov. 18, 1952 |
| 2,622,127 | Alsberg | Dec. 16, 1952 |
| 2,760,155 | Kelly | Aug. 21, 1956 |
| 2,767,374 | Slonczewski | Oct. 16, 1956 |

OTHER REFERENCES

"Transient Response Equalization Through Steady-State Methods," article in proceedings of the I.R.E., April 1949, pp. 447–450.